(12) United States Patent
Conte et al.

(10) Patent No.: US 8,131,970 B2
(45) Date of Patent: Mar. 6, 2012

(54) COMPILER BASED CACHE ALLOCATION

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 443 days.

(21) Appl. No.: 12/427,609

(22) Filed: Apr. 21, 2009

(65) Prior Publication Data
US 2010/0268889 A1 Oct. 21, 2010

(51) Int. Cl.
*G06F 12/00* (2006.01)

(52) U.S. Cl. .......................... 711/170; 711/129; 711/130

(58) Field of Classification Search .................. 711/170, 711/129, 130
See application file for complete search history.

(56) References Cited

U.S. PATENT DOCUMENTS

| 6,694,407 B1 * | 2/2004 | May et al. ..................... 711/129 |
| 7,000,072 B1 * | 2/2006 | Aisaka et al. ................. 711/118 |

* cited by examiner

*Primary Examiner* — Son Dinh
*Assistant Examiner* — Nam Nguyen
(74) *Attorney, Agent, or Firm* — Dorsey & Whitney LLP (57) ABSTRACT

Techniques a generally described for creating a compiler determined map for the allocation of memory space within a cache. An example computing system is disclosed having a multicore processor with a plurality of processor cores. At least one cache may be accessible to at least two of the plurality of processor cores. A compiler determined map may separately allocate a memory space to threads of execution processed by the processor cores.

20 Claims, 7 Drawing Sheets

COMPILER BASED CACHE ALLOCATION

BACKGROUND

Multicore processors have emerged as a mainstream computing platform in major market segments, including personal computer (PC), server, and embedded domains. As the number of processor cores on a given chip increase, so too does the potential demand on that chip's local memory. When the processor executes an instruction, for example, the processor first looks at its on-chip cache to find the data associated with that instruction to avoid performing a more time-consuming search for the data elsewhere (e.g., off-chip or on a main memory chip). Commercial multicore processors often use cache designs from uni-processors. Thus, multicore processors may share a single cache. With multiple cores, multiple incoming application streams may interfere with each other while seeking shared cache space, and as a result, may cause a shared cache and, thus, the processor to operate inefficiently. Other factors relating to multiple cores may also reduce processor efficiency.

Not all applications, however, benefit from the availability of cache resources. One example may be a streaming application, where data may be fetched into the cache, processed, and then may be unlikely to be reused. Thus, different types of applications sharing cache space with similar or equal priority may result in sub-optimal allocation of cache resources. Conflict among processor cores for the use of a shared cache may be expensive in terms of both latency and power as a result of additional requests to off-chip memory.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

This disclosure is drawn, inter alia, to methods, apparatus, systems and computer program products related to creating a compiler determined map for the allocation of memory space within a cache. In a multicore processor system, several applications may be running in parallel on separate cores, each with its own memory requirements. Memory space, however, may be finite. Depending on the design of the chip, individual processor cores may have to share local memory space with one or more other cores. This local memory may include, for example, the L2 or L3 caches.

The execution characteristics of some running applications may differ from the execution characteristics of other running applications. These execution characteristics may also change over time. One such execution characteristic may be the amount of local memory utilized to achieve adequate processing performance. For example, one application may operate more efficiently when a large amount of cache space is available, while another application may operate efficiently with any amount of cache space available. Thus, on a chip with limited cache space, the benefit to each application of obtaining additional cache resources may vary.

As is described herein, various examples for efficient use of shared cache resources in a multicore computing environment are disclosed. As a compiler compiles a program, it may simultaneously create a map for the partitioning of a shared cache such that conflict among the processor cores, which may process various threads of execution in parallel, may be reduced or minimized. Furthermore, as application execution characteristics change over time, cache allocation may change dynamically. Thus, by reducing the interference resulting from competition for cache space amongst the cores, overall system performance may be improved.

Figure 1:
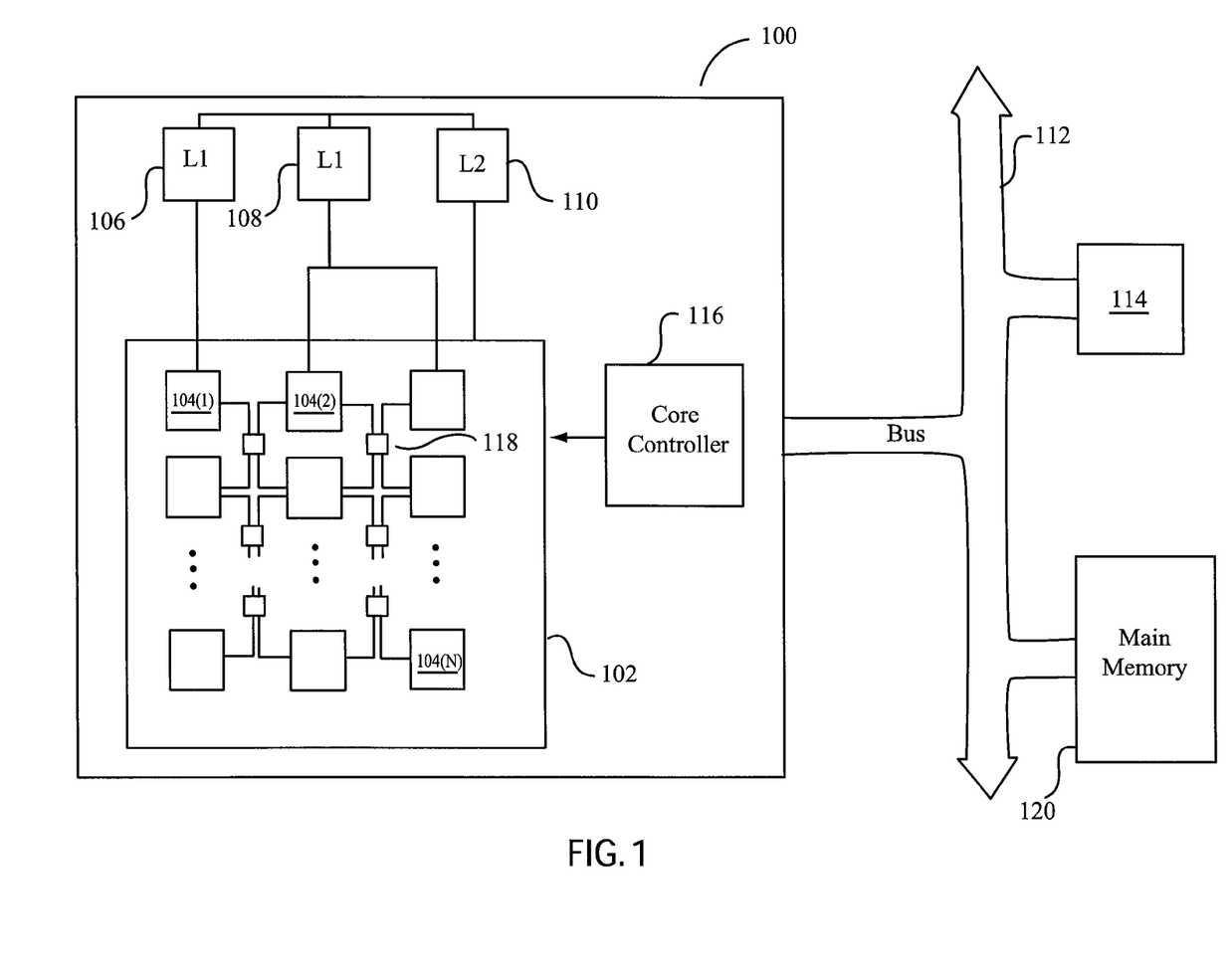
FIG. 1 illustrates a schematic illustration of a multicore computing system.

FIG. 1 shows an illustrative multicore processor 100, including a single integrated circuit having a processing core array 102. In other examples a multicore processor may include processors on separate integrated chips. The processing core array 102 may include some number (N) of processing cores 104(1)-104(N). Any suitable number of processing cores 104 may be provided. Individual processor cores 104 may generally be of any desired configuration including but not limited to a microprocessor (µP), a microcontroller (µC), a digital signal processor (DSP), or any combination thereof. Thus, individual processor cores 104 may include logic for executing program instructions as well as other functional blocks such as an arithmetic logic unit (ALU), a floating point unit (FPU), a digital signal processing (DSP) core, registers, accumulators, etc.

The multicore processor 100 may include any combination of dedicated or shared resources. A dedicated resource may be a resource 106 dedicated to a single processing core 104, such as a dedicated level one cache, or may be a resource 108 dedicated to any subset of the processing cores 104. A shared resource may be a resource 110 shared by some or all of the cores 104, such as a shared level two cache or a shared external bus 112. Such a shared external bus 112 may support an interface between the multicore processor 100 and another component 114. Such components 114 may include, but are not limited to, input-output (I/O) devices, external sensors, or the like, or may be a resource shared by any subset of the processing cores 104. A shared resource may also include main memory 120, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile.

As stated above, multicore processor 100 may have any suitable number of processing cores 104. For example, multicore processor 100 may have two (2) cores, four (4) cores, tens of cores, and even hundreds or more of processing cores. Some multicore processors may be homogenous, such that individual processing cores use a single core design. Other multicore processors may be heterogeneous, such that one or more of the processing cores may be different from one or more of other processing cores, and individual processor cores or subset of processor cores may be designed for a different role in the multicore processor 100.

The multicore processor 100 may include a core controller, or core interface 116. Core controller 116 may determine which processing tasks are to be processed by individual processing cores 104. One or more switches 118 may be provided. In one example, processing tasks may be routed to selected processing cores using switches 118.

FIG. 1 is an illustrative schematic of a multicore processor and does not illustrate physical location of the components illustrated therein. It is appreciated that the multicore processor 100 described herein is illustrative and that examples and modifications are possible. Design choices may be driven by, for example, considerations of hardware size and complexity versus performance, thermal energy and heat dissipation, processor speed, overall throughput, etc.

As may be appreciated by one skilled in the art, the multicore processor 100 may be provided in a suitable computing environment, such as a personal computer (PC). A computing environment may include the multicore processor 100, system memory, one or more buses, and one or more I/O devices, such as a keyboard, mouse, touch screen, display device, such as a CRT or LCD based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A PC may operate in a networked environment using logical connections to one or more remote computers. Such remote computers may be, for example, other PCs, servers, routers, network PCs, peer devices, or other common network nodes, and may include many or all of the elements described above relative to multicore processor 100. Logical connections may comprise, for example, a local-area network (LAN) or a wide-area network (WAN), intranets and the Internet.

Figure 2:
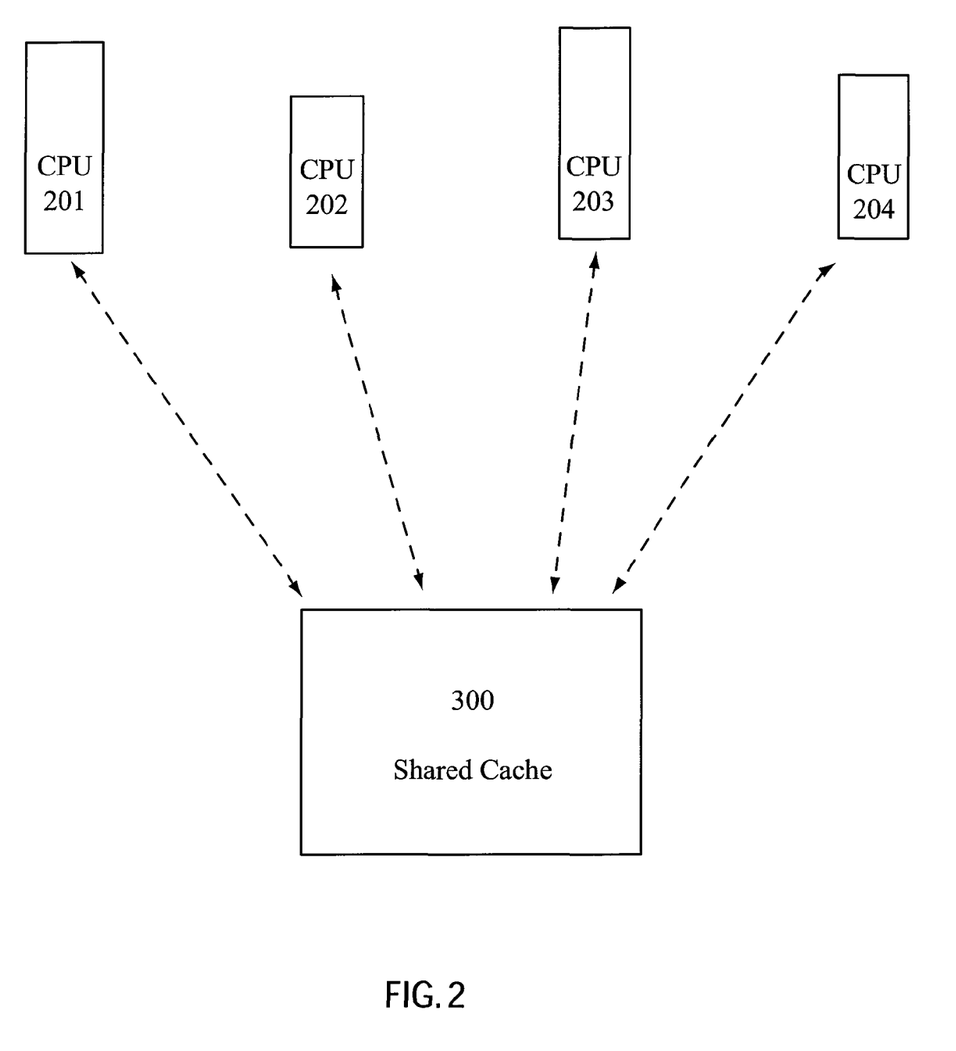
FIG. 2 illustrates a schematic representation of a shared cache in accordance with one example.

In one example, FIG. 2 illustrates a plurality of processor cores 201-204, suitable for use in a multicore processor system. Individual processor cores 201-204 may have differing performance characteristics, as represented by the varying sizes of cores 201-204. For example, the larger cores 201 and 203 may be of higher performance, suitable for more complex software applications, as compared to the smaller cores 202 and 204, which may be suitable for processing software applications of less complexity. It is to be appreciated that more or fewer cores may be provided, that the cores may be of uniform or varying size, and that specific descriptions of the cores herein are not intended to be limiting.

A suitable shared cache 300 is depicted in FIG. 2 for use with the plurality of processor cores 201-204. Individual cores 201-204 may transfer data to and from shared cache 300. Shared cache 300 may be partitioned such that individual cores 201-204 may only have access to certain areas within the cache.

Figure 3A:
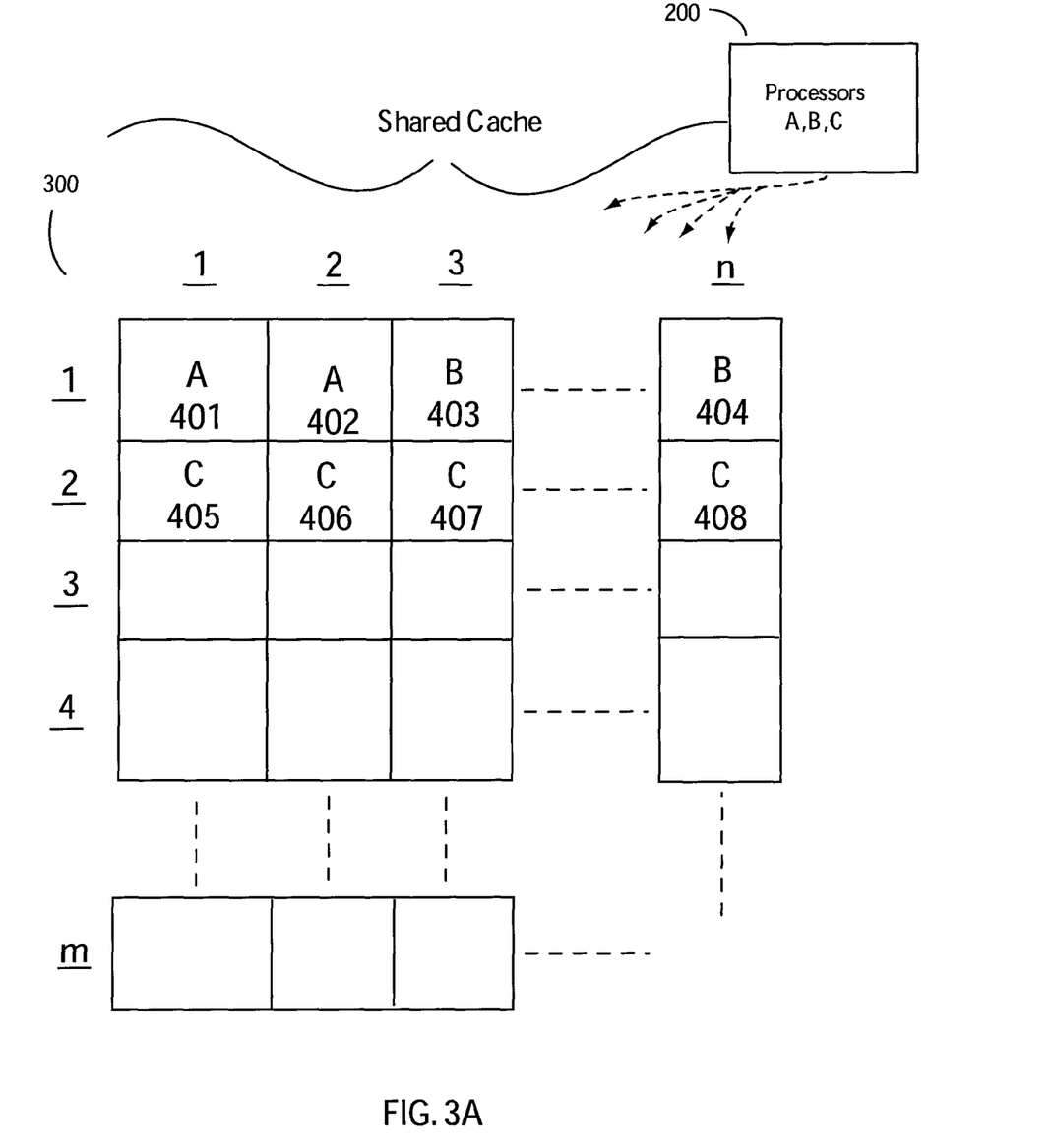
FIG. 3a illustrates a schematic representation of a partitioned cache in accordance with one example.

FIG. 3a is an illustrative schematic of the partitioning of a shared cache 300 suitable for use with any of the examples disclosed herein. The rows in FIG. 3a represent the 1 through m lines in shared cache 300. The columns in FIG. 3a represent the 1 through n ways into shared cache 300. Thus, block 401 in FIG. 3a represents way "1" into cache line "1" in shared cache 300. Similarly, block 408 represents way "n" into cache line "2" in shared cache 300. FIG. 3a depicts one possible partitioning of shared cache 300. A first processor core "A" is depicted as having been allocated ways "1" and "2" into cache line "1". A second processor core "B" is depicted as having been allocated ways "3" through "n" into cache line "1". Thus, in the example shown, provided that n is larger than 2, processor core "B" has been allocated a larger portion of shared cache 300 than processor core "A". Furthermore, a processor core "C" is depicted as having been allocated all the ways "1" through "n" into cache line "2". Thus, processor core "C" has been allocated a larger portion of shared cache 300 that either processor cores "A" or "B". It is to be appreciated that processor cores 200 may be partitioned shared cache 300 space in any combination of cache lines and ways, and that some processor cores 200 may share any combination of lines and ways. The specific partitioning of shared cache 300 in FIG. 3a is not in any way intended to be limiting.

Figure 4:
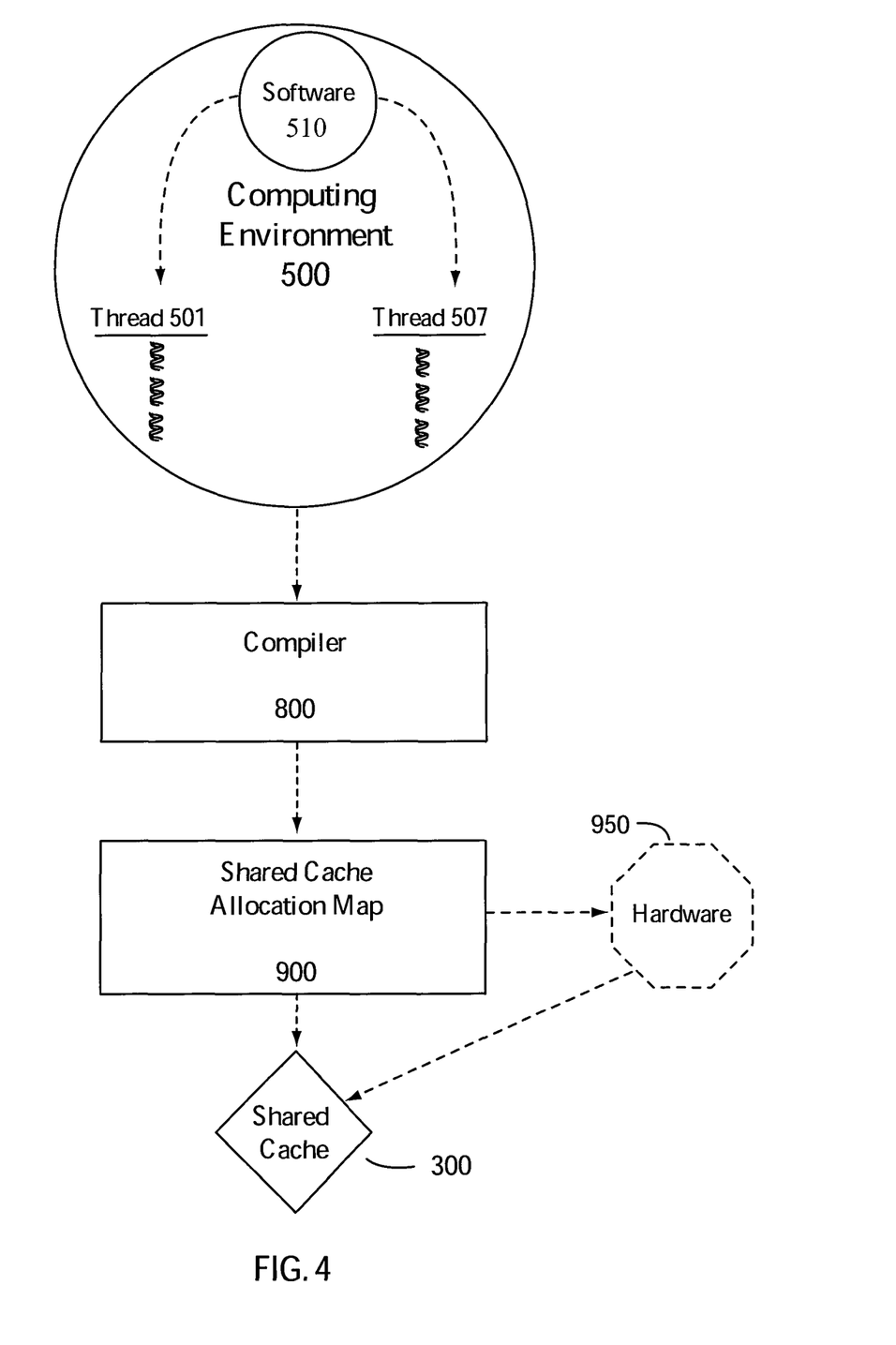
FIG. 4 illustrates an schematic representation of a system for cache allocation in accordance with one example.

In yet other examples, cache partitioning may be accomplished by reference to a compiler determined cache allocation map. A compiler is a computer software application that translates text from a high-level programming language into a lower level language such as machine language or assembly language. FIG. 4 illustrates a flowchart diagram of a suitable process by which cache partitioning based at least in part on compiler mapping may be accomplished. As depicted in FIG. 4, a computer software application 510 containing a plurality of threads of execution 501-502 in a computing environment 500 may be compiled by a compiler 800. Because the compiler 800 has direct access to the software code, the compiler 800 may be able to determine the execution characteristics of the computer software application 510, such as, whether a particular thread 501-502, when executed, may utilize a large or small cache 300 space for adequate performance. Then, based at least in part on these characteristics of the computer software application 510, or the individual threads 501-502 thereof, as determined by the compiler 800, a cache allocation map may be created [block 900]. For example, the compiler 800 may allocate a larger cache 300 area when the compiler 800 determines that a thread 501-502, which the compiler 800 has compiled, may utilize a larger cache 300 area. Alternatively, the compiler 800 may allocate a smaller cache 300 area when the compiler 800 determines that a thread 501-502, which the compiler 800 has compiled, may utilize only a smaller cache 300 area.

In some examples, the compiler 800 may analyze profile information of the software application. Using a profiler, for example, the compiler 800 may analyze the behavior of a program as it executes, which may include the frequency and duration of function calls or other subroutines within the program. Profile information may also be analyzed using sampling techniques, wherein a sampling profiler may probe the target application's program counter at regular intervals using operating system interrupts. Then, using any of this profile information, the compiler 800 may create a cache allocation map.

In other examples, the compiler 800 may make a dynamic assessment of data locality of reference (locality) for shifting allocation. Locality refers to the frequency with which data is accessed. As that locality increases, the allocation may shift to give more space for that data. Data that is assessed as having more locality (where there is more frequent return to the data) may be given more access. Data that is assessed as having less locality may be given limited access. Alternatively, this assessment may be static and made at the beginning of execution based at least in part on an initial review of the data or may be dynamic as the compiler determines that the data has more locality than expected. From this locality information, the compiler 800 may then create a cache allocation map.

Figure 3B:
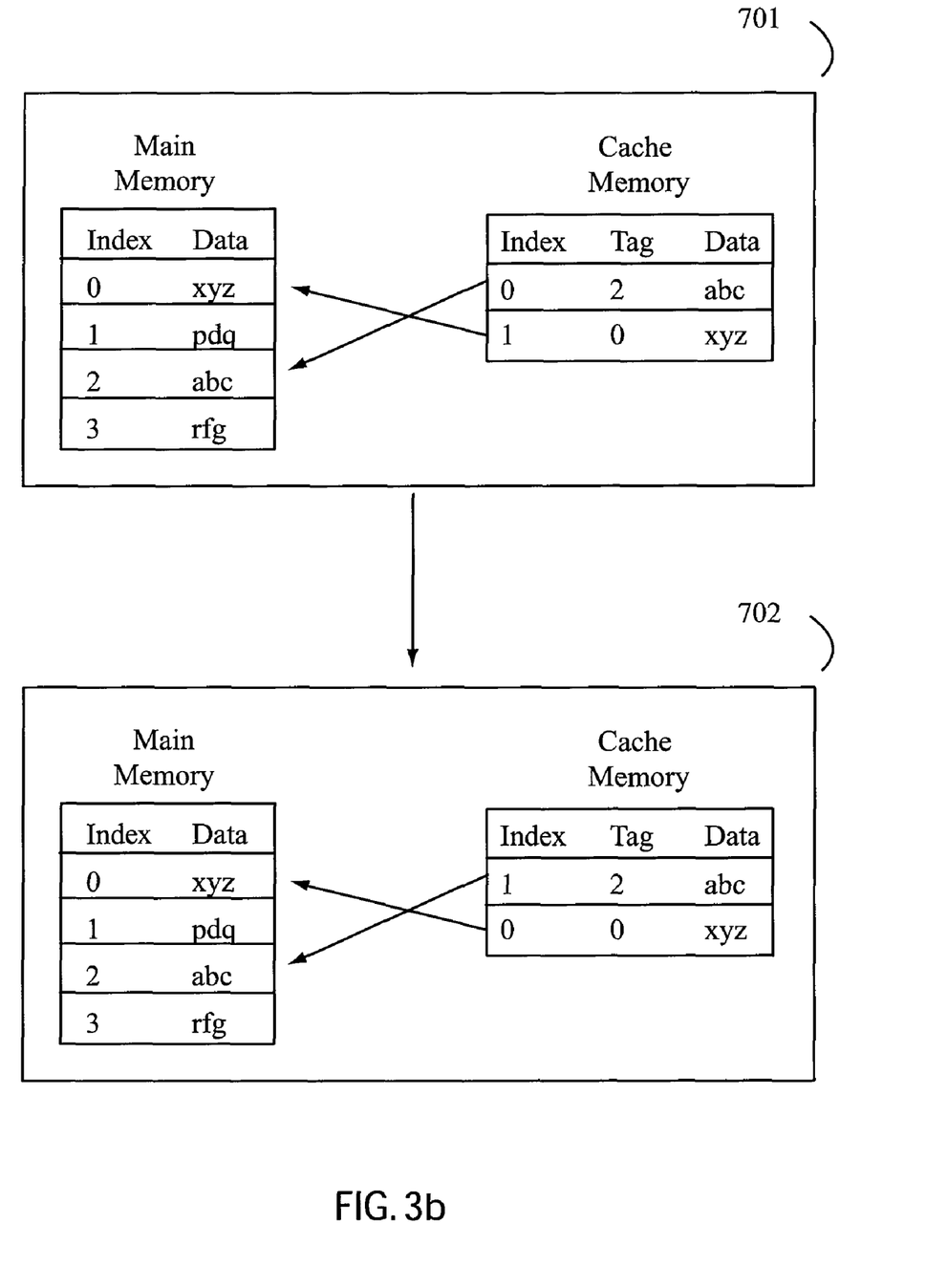
FIG. 3b illustrates a schematic representation of a re-indexed cache in accordance with one example.

The cache allocation map may then be translated to the cache 300 by the compiler 800. This action may be accomplished by, for example, re-indexing the address bits in the cache 300, or any other suitable means, as will be apparent to those skilled in the art. Thus, the location where data is stored in a shared cache may be determined at the software level, prior to processing by a processor core, rather than at the hardware level. FIG. 3b is a schematic illustration of a cache that has been re-indexed. In block 701, the cache memory index "0" corresponds with main memory index "2", as marked by the tag "2". After re-indexing, in block 702, cache memory index "1" is now associated with main memory index "2", as marked by the tag "2". Cache index "0" has been changed to correspond with main memory index "0".

In alternative examples, mapping may be done on hardware, prior to being translated to the chip. For example, within the processing system architecture may be embedded hardware configured for mapping a cache. The compiler may dictate the map to the hardware, based at least in part on the information it has gathered, and then the hardware may create the map for the cache. This alternative example is depicted in FIG. 4, wherein shared cache allocation map 900 may be directed to hardware 950, and then translated to shared cache 300.

It is to be appreciated that software application execution characteristics may change dynamically. Thus, in any of the examples disclosed herein, cache partitioning may be configured to change over time in a dynamic manner. Furthermore, in examples that use compiler mapping, Bloom filters, reference counts based at least in part on thread identification (thread ID) using a performance counter, or any other suitable means may be used to determine when to re-map the cache.

Figure 5A:
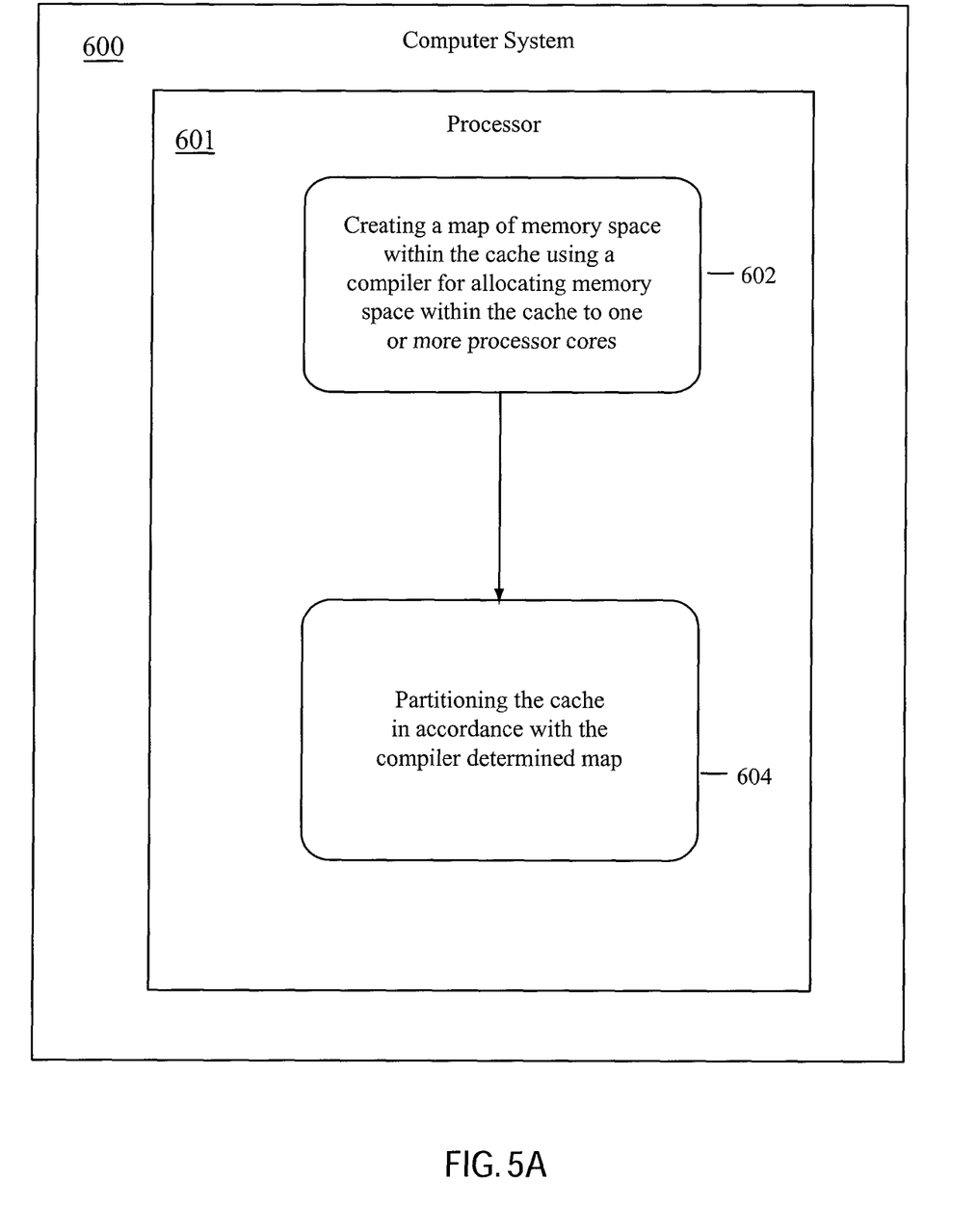
FIG. 5a illustrates an example flow diagram of a process for cache allocation in accordance with one example, all arranged in accordance with the present disclosure.

In one particular example, as shown in FIG. 5a, a computer system 600 may include a processor 601 configured for performing an example of a method for partitioning a shared cache. In other examples, various actions or portions of various actions of the method may be performed outside of the processor 601. In action 602, the method may include creating a map of memory space within the cache using a compiler for allocating memory space within the cache to one or more processor cores. In action 604, the method may include partitioning the shared cache in accordance with the compiler determined map. As disclosed above, the mapping may be done by the compiler re-indexing the address bits in the cache, by hardware placed in front of the cache, or by any suitable means as will be appreciated by those in the art.

Figure 5B:
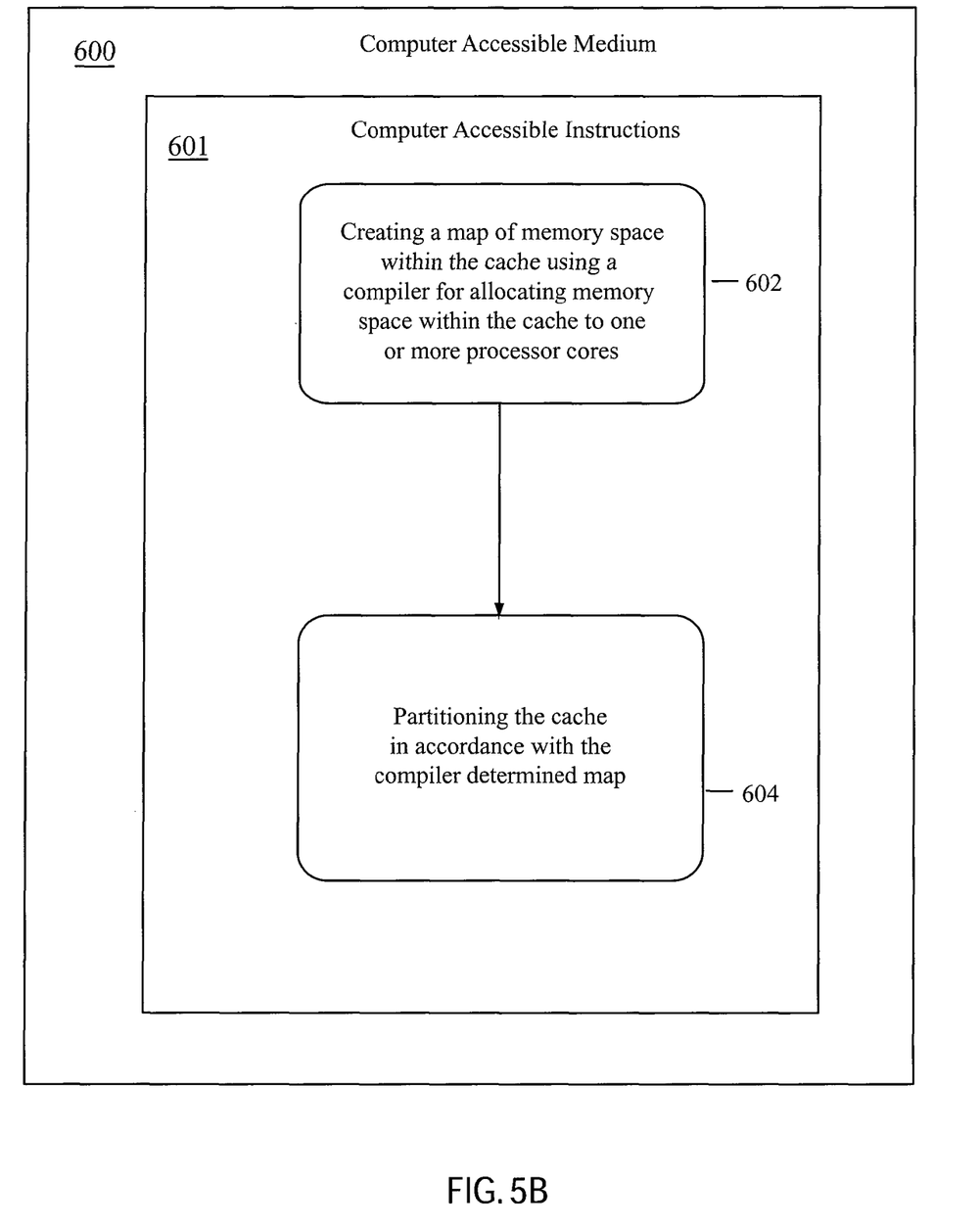
FIG. 5b illustrates an example flow diagram of a computer accessible medium for cache allocation in accordance with one example, all arranged in accordance with the present disclosure.

In another example, as shown in FIG. 5b, a computer accessible medium 600 having stored thereon computer accessible instructions 601 for performing a procedure for allocating a cache space within a multicore processor computing system. In action 602, the procedure may include creating a map of memory space within the cache using a compiler for allocating memory space within the cache to one or more processor cores. In action 604, the procedure may include partitioning the shared cache in accordance with the compiler determined map. As disclosed above, the mapping may be done by the compiler re-indexing the address bits in the cache, by hardware placed in front of the cache, or by any suitable means as will be appreciated by those in the art.

The foregoing describes various examples of compiler based cache allocation. Following are specific examples of methods and systems of compiler based cache allocation. These are for illustration only and are not intended to be limiting.

Disclosed in some examples is a computing system comprising a multicore processor, at least one cache that is shared among the processor cores, and a compiler capable of creating a map for the partitioning of memory space within the shared cache. In further examples, the compiler may create the map for the partitioning of memory space within the shared cache based at least in part on the execution characteristics of the threads of execution. In some of these examples, the map for the partitioning of memory space within the shared cache may be translated from the compiler to the shared cache by re-indexing address bits in the shared cache. In other examples, memory space within the cache may be partitioned by restricting the number of ways the processor cores have access into the cache. In these examples, the ways into the cache may be partitioned separately at each cache line. In still other examples, Bloom filters may be used to determine when to initiate a re-mapping of the shared cache. Alternatively, reference counts based at least in part on thread identification, collected by means of a performance counter, may be used to determine when to initiate a re-mapping of the shared cache.

In other examples, a method is disclosed for partitioning the cache in accordance with a compiler determined map. In this example, a compiler may create a map for the allocation of memory space within the shared cache based at least in part on characteristics of one or more software applications, the threads of execution of which are to be processed on one or more processor cores within the multicore processor computing system. In some further examples, the map for the allocation of memory space within the cache may be created within a hardware located in front of the cache, based at least in part on information which has been determined by the compiler and sent to the hardware. In other examples, the map for the allocation of memory space within the cache may be translated from the compiler to the cache by re-indexing address bits in the cache. Additionally, the map for the allocation of memory space within the cache may restrict a number of ways the plurality processor cores have access into the cache. In yet other examples, the map for the allocation of memory space within the cache is reconfigured dynamically over the course of the execution of the one or more software applications.

In other example, a computer accessible medium is disclosed, having stored thereon computer executable instructions for performing a procedure for allocating a cache space within a multicore processor computing system, the procedure comprising creating a compiler determined map for the allocation of memory space within the cache partitioning the cache in accordance with the compiler determined map. In some further examples, a compiler creates the map for the allocation of memory space within the shared cache based at least in part on characteristics of one or more software applications, threads of execution of which are to be processed on one or more processor cores within the multicore processor computing system.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computing system, comprising:
   a multicore processor comprising a plurality of processor cores;
   a cache that is accessible to at least two of the plurality of processor cores; and
   a compiler configured to create a map to allow allocation of memory space within the cache, wherein the compiler is configured to create the map for the allocation of memory space within the cache based at least in part on characteristics of one or more software applications, wherein the one or more software applications comprise threads of execution to be implemented on the plurality of processor cores.

2. The computing system of claim 1, wherein the characteristics of the one or more software applications include locality of reference.

3. The computing system of claim 1, wherein the characteristics of the one or more software applications include profile information.

4. The computing system of claim 1, wherein the compiler is further configured to create the map for the allocation of memory space within the cache within a hardware located in front of the cache, based at least in part on information which has been determined by the compiler and sent to the hardware.

5. The computing system of claim 1, wherein a processor core of the plurality of processor cores is configured to translate the map for the allocation of memory space within the cache to the cache by re-indexing address bits in the cache.

6. The computing system of claim 1, wherein the map for the allocation of memory space within the cache is configured by the compiler to restrict a number of ways the plurality processor cores have access into the cache.

7. The computing system of claim 6, wherein the compiler is configured to restrict the number of ways separately at a cache line.

8. A computing system, comprising:
    a multicore processor comprising a plurality of processor cores;
    a cache that is accessible to at least two of the plurality of processor cores; and
    a compiler configured to create a map to allow allocation of memory space within the cache, wherein the map for the allocation of memory space within the cache is reconfigured dynamically over the course of the execution of one or more software applications by a processor core of the plurality of processor cores.

9. The computing system of claim 8, wherein one or more Bloom filters are configured to determine when to initiate a re-mapping of the cache.

10. The computing system of claim 8, wherein reference counts based at least in part on a thread identification of a thread of execution, collected by a performance counter, are used to determine when to initiate a re-mapping of the cache.

11. The computing system of claim 8, wherein the compiler is configured to create the map for the allocation of memory space within the cache based at least in part on characteristics of one or more software applications.

12. A method for the allocation of memory space within a cache in a multicore processor computing system, comprising:
    creating a map of memory space within the cache using a compiler to allocate memory space within the cache to one or more processor cores within the multi-core computing system, wherein creating the map comprises creating the map for the allocation of memory space within the cache based at least in part on characteristics of one or more software applications, threads of execution of which are to be processed on the one or more processor cores within the multicore processor computing system.

13. The method of claim 12, wherein creating the map comprises creating the map for the allocation of memory space within the cache within a hardware located in front of the cache, based at least in part on information which has been determined by the compiler and sent to the hardware.

14. The method of claim 12, further comprising translating the map for the allocation of memory space within the cache from the compiler to the cache by re-indexing address bits in the cache.

15. The method of claim 12, further comprising restricting a number of ways the one or more processor cores have access into the cache.

16. The method of claim 12, further comprising restricting the number of ways the one or more processor cores have access into the cache separately at a cache line.

17. A method for the allocation of memory space within a cache in a multicore processor computing system, comprising:
    creating a map of memory space within the cache using a compiler to allocate memory space within the cache to one or more processor cores within the multi-core computing system; and
    reconfiguring the map for the allocation of memory space within the cache dynamically over the course of the execution of the-one or more software applications.

18. The method of claim 17, further comprising determining when to initiate a re-mapping of the cache using one or more Bloom filters.

19. A computer accessible medium having stored thereon computer executable instructions for performing a procedure for allocating a cache space within a multicore processor computing system, the procedure comprising:
    creating a compiler determined map for the allocation of memory space within the cache, wherein creating the compiler determined map comprises creating the compiler determined map for the allocation of memory space within the cache based at least in part on characteristics of one or more software applications, threads of execution of which are to be processed on one or more processor cores within the multicore processor computing system; and
    partitioning the cache in accordance with the compiler determined map.

20. The computer accessible medium of claim 19 wherein the procedure further comprises reconfiguring the map for the allocation of memory space within the cache dynamically over the course of the execution of the one or more software applications.

* * * * *

UNITED STATES PATENT AND TRADEMARK OFFICE
CERTIFICATE OF CORRECTION

| | | |
|---|---|---|
| PATENT NO. | : 8,131,970 B2 | Page 1 of 1 |
| APPLICATION NO. | : 12/427609 | |
| DATED | : March 6, 2012 | |
| INVENTOR(S) | : Conte et al. | |

It is certified that error appears in the above-identified patent and that said Letters Patent is hereby corrected as shown below:

In Column 12, Line 25, in Claim 17, delete "of the-one" and insert -- of one --, therefor.

Signed and Sealed this
Fifth Day of June, 2012

David J. Kappos
*Director of the United States Patent and Trademark Office*